United States Patent [19]

Smith

[11] Patent Number: 5,128,161

[45] Date of Patent: Jul. 7, 1992

[54] METHOD FOR PREPARING AEROSOL PACKAGED GLAZE FORMING COMPOSITION

[75] Inventor: Robert M. Smith, Ballwin, Mo.

[73] Assignee: Par-Way Group, Costa Mesa, Calif.

[21] Appl. No.: 668,159

[22] Filed: Mar. 12, 1991

[51] Int. Cl.$^5$ .............. A21D 15/08; A23L 1/00; A23L 3/00; B65B 31/00
[52] U.S. Cl. .................. 426/326; 426/658; 426/394; 426/399; 426/116; 426/475; 426/94; 426/302
[58] Field of Search ............ 426/116, 394, 271, 487, 426/658, 324, 326, 399, 474, 475, 94, 302

[56] References Cited

U.S. PATENT DOCUMENTS

| | | | |
|---|---|---|---|
| 2,929,720 | 3/1960 | Whittenberger | 426/271 |
| 3,855,136 | 12/1974 | McDole et al. | 252/49.5 |
| 3,917,613 | 11/1975 | Humbert et al. | 426/660 |
| 4,259,360 | 3/1981 | Venetucci et al. | 426/487 |
| 4,390,550 | 6/1983 | Kahn et al. | 426/619 |
| 4,514,281 | 4/1985 | Baumert et al. | 208/47 |
| 4,645,674 | 2/1987 | Lang et al. | 426/658 |
| 4,828,841 | 5/1989 | Porter et al. | 106/205 |
| 4,882,182 | 11/1989 | Haus et al. | 426/116 |

FOREIGN PATENT DOCUMENTS

| | | | |
|---|---|---|---|
| 1905596 | 8/1970 | Fed. Rep. of Germany | 426/116 |
| 1192274 | 8/1986 | Japan | 426/116 |

OTHER PUBLICATIONS

Food Engineering, "New Aerosol Formulations Consumer Tested" May 1966, pp. 112-114.
The Functional Edge-Maltrin, p. 5.

*Primary Examiner*—Steven Weinstein
*Attorney, Agent, or Firm*—James A. Quinton; Frank Frisenda, Jr.

[57] ABSTRACT

A low pH egg wash substitute is prepared by blending maltodextrin having a DE of from 1 to 20% with a plasticizer, a secondary film former, 70 to 90% water and preferably a sufficient amount of a microbial inhibitor to effectively retard microbe growth. The composition is rendered essentially chloride ion free by circulating the concentrate through an anionic or mixed ion exchange resin bed. The substantially chloride ion free concentrate is then heat pasteurized and preferably purged with an inert gas. The concentrate is then added to a typical metal aerosol container (e.g., tin coated steel or aluminum) which is then charged with an appropriate propellant. The resulting aerosol packaged glaze forming composition has a low pH which retards microbial growth while at the same time is only mildy corrosive to its container.

15 Claims, No Drawings

METHOD FOR PREPARING AEROSOL PACKAGED GLAZE FORMING COMPOSITION

BACKGROUND OF THE INVENTION

1. Field of the Invention

The subject of the invention relates to an aerosol packaged improved surface glaze composition for bakery goods and a method of producing a surface glaze for application on edible bakery products which can be used as a substitute for an egg wash.

2. Description of the Prior Art

Glazes have long been used in the production of bakery products such as bread, rolls or pastries. A common practice in the bakery industry has been to use an egg wash to provide an attractive glaze. Egg washes have many disadvantages. There is a bacterial problem inherent in the handling and application of raw eggs to the surface of baked products. Moreover, egg washes must be brushed on by hand which is a labor intensive procedure. The search for a suitable egg wash substitute has been ongoing for some time. However, such products have not replaced the egg wash. Many of the substitutes have stability problems and must be refrigerated or used shortly after they have been prepared. See for example, U.S. Pat. No. 3,088,829. (Rapaport)

Dextrin containing egg wash substitutes have been proposed. Such products are desirable because they do not have the deleterious bacterial problem of the egg wash. However, these products need to be mixed at the bakery and often need to be used within several hours of preparation. See, for example U.S. Pat. No. 4,645,674 (Lang). Moreover, such products need to be mixed at the bakery and hence, use of such products are inconvenient. Liquid protein formula products have also been used. Such products typically employ a milk derivative such as sodium caseinate and are often applied by brushing on the product. However, these products have limited stability and need to be refrigerated. Moreover, egg washes and protein formulas cannot withstand the low pH (below 5.0) or the heat pasteurization (140°-150° F. @ 30 min.) necessary to insure microbial stability necessary in an aerosol product.

Coating of tablets with film coating polymers such as maltodextrin and polydextrose is also known. See, for example U.S. Pat. Nos. 4,649,894 (Porter), 4,683,256 (Porter) and 4,802,924 (Woznicki).

Thus, there is a need for an egg wash substitute which is storage stable after preparation and which does not require refrigeration. Such a product should be ready for use in a storage stable container which allows the egg wash substitute to be sprayed on the bakery products without mixing.

SUMMARY OF THE INVENTION

The present invention is directed to an improved composition for producing a glaze for bakery goods and a method of preparation of such a composition. In another aspect of the invention, a storage stable, aerosol packaged glaze composition which is a suitable substitute for an egg wash is provided.

It is an object of the invention to provide a low pH egg wash substitute which is resistant to microbial growth.

It is a further object of the invention to provide a low pH aerosol formula which is not unduly corrosive to a metal aerosol container.

It is a further object of the invention to provide a stable, pre-mixed egg wash substitute which is egg and protein free.

It is an additional object of the invention to provide an egg wash substitute which can be applied to the bakery product via an aerosol spray.

These and other objects of the invention will be apparent from the following detailed description.

According to the invention a low pH liquid concentrate is prepared by blending the following components:

10 to 30% of dextrin preferably maltodextrin having a DE of from 1 to 20%, 0 to 6% of a plasticizer, 0 to 4% of a secondary film former, 70 to 90% water; and preferably a sufficient amount of a microbial inhibitor to effectively retard microbe growth.

The composition is rendered essentially chloride ion free by circulating the concentrate through an anionic or mixed ion exchange resin bed. Alternatively, since the dextrin component is primarily responsible for the chloride ions, the dextrin component mixed with water can be circulated through the ion exchange resin bed prior to combining it with the other components.

The substantially chloride ion free concentrate is then heat pasteurized and preferably purged with an inert gas, preferably nitrogen gas. The concentrate is then added to a typical metal aerosol container (e.g., tin coated steel or aluminum) which is then charged with an appropriate propellant. The resulting aerosol packaged glaze forming composition has a low pH which retards microbial growth while at the same time is only substantially non-corrosive to the metal aerosol can. In addition, the aerosol product is storage stable and ready to use without mixing at the bakery. The product can be easily applied to the baked goods by spraying. When applied to the bakery goods, the composition dries to form a shiny glaze. The aerosol glaze forming product provides a desirable egg wash substitute.

The preferred embodiment of the present invention is illustrated in the drawings and examples. However, it should be expressly understood that the present invention should not be limited solely to the illustrative embodiment.

DETAILED DESCRIPTION OF THE INVENTION

According to the invention, an improved glaze producing composition is provided for use on bakery goods as an egg wash substitute. In another aspect of the invention, a method of preparation of a glaze for use as egg wash substitute for bakery products is provided. The composition can be packaged in an aerosol container, and hence, is easily deliverable onto the baked goods by spraying.

According to the invention a low pH liquid concentrate for charging aerosol containers is prepared by mixing 10 to 30% by weight of concentrate of dextrin preferably maltodextrin having a DE of 1 to 20 with water in an amount of 70 to 90% of the formed concentrate, 0 to 6% of a plasticizer and 0 to 4% of a secondary film former are then added to the water-dextrin mixture. Preferably, a microbial inhibitor is also added to the concentrate in an amount to effectively retard microbe growth.

According to the invention, the concentrate is rendered substantially chloride ion free by circulating the concentrate through an anionic or mixed ion exchange resin bed. Alternatively, since the dextrin component is usually primarily responsible for the chloride ions, the dextrin component particularly maltodextrin can be circulated through the ion exchange resin bed prior to combining it with the other components. The substantially chloride free concentrate is then heat pasteurized. Desirably, an inert gas preferably nitrogen is then bubbled through the heat pasteurized concentrate. The concentrate is then added to a typical metal aerosol container for example, tin coated steel or aluminum which is then charged with the appropriate propellant. The concentrate has a pH below 7 and preferably has a pH of 4 to 5 and most preferably has a pH of about 4.5. The resulting aerosol packaged, egg wash substitute has a low pH which retards microbial growth while at the same time is only mildly corrosive to the metal container. The packaged egg wash substitute is storage stable for one (1) year or longer and can be readily used without any mixing at the baking site. The product can be easily applied to baked goods by spraying without the necessity of hand brushing.

Preferably the concentrate of the subject invention is prepared by mixing the components in a single tank. Water, preferably purified to USP standards is first added to the tank in an amount of from 70 to 90% most preferably in an amount of 75 to 85% by weight of the total concentrate. The purified water can be supplied through convenient purification methods such as a reverse osmosis system, ultra filtration, dionization or distillation. Preferably, in addition to the USP specifications, the water should meet a microbial limit of less than 100 colony forming units per milliletter with no pathogenic organisms present. 10 to 30% by weight of concentrate of dextrin preferably maltodextrin most preferably, 12 to 18% maltodextrin is then added to the water under vigorous mixing. The dextrin component should have a DE of 1 to 20, preferably a DE of 5 to 15. Preferably a plasticizer in an amount of 0 to 6% is then added to the tank. Desirably the plasticizer is selected from the group consisting of polyethylene glycol, hydrogenated glucose syrup, triacelin, proplylene glycol and glycerine, and most preferably the plasticizer is polyethylene glycol. Typically the plasticizer is used in an amount of 1 to 5%.

Preferably a secondary film former is then added in an amount of 0 to 4% by weight preferably in an amount of 1 to 3%. Desirably the secondary film former is either propylene glycol alginate or sodium alginate and preferably propylene glycol alginate.

Maltodextrin can come from several commercial sources, e.g., MALTRIN maltodextrins by Grain Processing Corp., Amaizo Lo-Dex maltrodextrins by American Maize Products Co. or Star-Dri maltodextrins by A. E. Staley Mfg. Co. Examples of suitable polyethylene glycol include carbowax polyethylene glycol 400, 3350 or 8000 supplied by Union Carbide Corporation. Examples of suitable propylene glycol alginate include Kelcoloid S made b the Kelco Division of Merck & Co.

The liquid concentrate then is prepared by mixing the aforementioned ingredients together until a uniform mixture is obtained typically for 10 minutes to 30 minutes. Optionally a anti-microbial agent is added, in a sufficient amount to inhibit microbial growth in the packaged aerosol product. Preferably the microbial inhibitor is added in an amount from about 0.05 to 0.5% by weight preferably from about 0.1 to 0.4% by weight. Most preferably the microbial inhibitor is potassium sorbate or sorbic acid or both. Most preferably 0.05 to 0.2% by weight of potassium sorbate and 0.05 to 0.2% by weight of sorbic acid are used as the microbial inhibitor.

It has been found that the resulting concentrate has a deleterious corrosive effect on a typical metal aerosol container. Commercially available maltodextrin contains chloride ions in amounts up to 2000 ppm which contribute to the corrosive nature of the concentrate. Thus, the chloride ions need to be substantially reduced. This is a particularly important factor which affects the self life of the product. The chloride ion removal can be accomplished by either treating the dextrin (preferably maltodextrin) component prior to mixing or treating the entire composition after mixing has been accomplished.

When the chloride removal is performed on the prepared concentrate, the mixed concentrate is circulated through an anionic or mixed ion, ion exchange resin bed to substantially reduce or remove the chloride ions present. Optionally as set forth above, the maltodextrin component (dextrin component) alone can be circulated through the anionic or mixed bed ion exchange resin prior to mixing. When the maltodextrin is treated to remove chloride ions prior to mixing with the other components, the maltodextrin is dissolved in water of the same purity as used for blending the remaining concentrate. From 50 to 100% of the total water for the concentrate may be used to dissolve the maltodextrin for passage over the deionization bed. If such an option is followed, the concentrate need not be passed over the ion exchange resin bed.

Typically, a weak base anionic resin such as DOWEX 66 is appropriate for the use in the ion exchange resin bed. The resin is packed in a column. Either the maltodextrin or the concentrate is circulated through the column. Optionally the dextrin or preferably maltodextrin component or the mixed concentrate is filtered prior to circulating through the resin column. The resulting concentrate preferably has a chloride ion concentration of less than 25 ppm and preferably less than about 10 ppm and most preferably less than about 3 ppm.

After the concentrate has been prepared and chloride ions removed, the concentrate is heat pasteurized by heating the concentrate to a sufficiently high temperature to kill any pathogenic microorganisms and also to drive out any dissolved oxygen in the concentrate. Preferably liquid concentrate is heated to about 140° F. to 165° F. Preferably during the heating, an inert gas, most preferably nitrogen, is bubbled through the liquid concentrate to facilitate the removal of any remaining oxygen. The heat pasteurized concentrate can then be used as a filler for an aerosol container without the use of corrosion inhibitors. Optionally, a small amount of a food grade corrosion inhibitors may be used.

The aerosol containers are then filled with the concentrate. Typically the aerosol container is a tin coated steel container or an aluminum container. Preferably the concentrate filled container is then purged with an inert gas preferably, nitrogen gas. The resulting head space is then evacuated to 15 to 20 inches of vacuum prior to charging with propellant and sealing in a container. The inert gas purging further facilitates the removal of residual oxygen from the head space which can lead to bacterial growth. Optionally, a mild, anti-corrosion agent that is approved for food use can be added to the concentrate. For example, morpholinium oleate in an amount of about .1% by weight can be used.

The purged, concentrate filled container is then charged with an appropriate propellant. Preferably the propellant is provided in an amount of from 4 to 24% of finished aerosol product. Desirably the propellant is a liquified petroleum gas such as propane, isobutane, normal butane or a combination of such gasses. Other propellants can also be used such as carbon dioxide, nitrous oxide or nitrogen. The resulting aerosol, egg wash substitute is storage stable for long periods of time, easily applicable on the bakery goods by spraying and protein and egg free. In use the glaze dries on the baked goods to provide an attractive shiny finish.

The foregoing is considered as illustrative only to the principles of the invention. Further, since numerous changes and modifications will occur to those skilled in the art, it is not desirable to limit the invention to the exact construction and operation shown and described above, and accordingly all suitable modifications and equivalents may be resorted to, falling within the scope of the invention.

I claim:

1. A process for preparing a storage stable aerosol packaged glaze forming composition suitable for use as an egg wash substitute on bakery goods comprising, a) forming a liquid concentrate having a pH of less than 7 by mixing:

10 to 30% by weight of concentrate of maltodextrin having a DE of 1 to 20;

70 to 90% by weight of concentrate of water, 1 to 5% by weight of concentrate of a plasticizer selected from the group consisting of polyethylene glycol, hydrogenated glucose syrup, triacelin, propylene glycol and glycerine;

1 to 3% by weight of concentrate of a secondary film former selected from the group consisting of propylene glycol alginate and sodium alginate; and b) insuring said concentrate is at least substantially free of chloride ions by either:

i) mixing said maltodextrin of part a) with at least one-half of said water of part a), and circulating said maltodextrin-water mixture over an anionic or mixed ion, ion exchange resin bed prior to adding said plasticizer and said secondary film former or by;

ii) circulating said concentrate of part a) through an anionic or mixed ion, ion exchange resin bed after mixing;

c) then heat pasteurizing said liquid concentrate to kill micro-organisms contained therein and to drive dissolved oxygen therefrom;

d) filling a metal aerosol container with said heat pasteurized concentrate;

e) charging a propellant into said heat pasteurized concentrate filled aerosol container in an amount of 4 to 24% of the finished aerosol product.

2. The process of claim 1 wherein said plasticizer is polyethylene glycol and said secondary film former is propylene glycol alginate.

3. The process of claim 2 further comprising bubbling an inert gas through said concentrate to displace residual oxygen therein after said concentrate has been heat pasteurized;

said aerosol container being only partially filled with said concentrate to leave a head space in said container;

purging said head space of said container with said inert gas and thereafter evacuating said head space prior to charging said aerosol container with said propellant.

4. The process of claim 3 wherein said inert gas is nitrogen.

5. The process of claim 2 further comprising adding a microbial inhibitor to said concentrate.

6. The process of claim 5 wherein said microbial inhibitor is selected from the group consisting of sorbic acid in an amount of from 0.05 to 0.20% by weight of concentrate and potassium sorbate in an amount of 0.05 to 0.20% by weight of concentrate.

7. The process of claim 6 further comprising adding a food grade corrosion inhibitor to said concentrate.

8. The process of claim 6 wherein said corrosion inhibitor is morpholinium oleate in an amount of about 0.1% by weight of concentrate.

9. The process of claim 6 wherein the chloride ions are removed from said maltodextrin by circulating the maltodextrin, water mixture over an anionic or mixed ion, ion exchange resin bed prior to adding the plasticizer and secondary film former.

10. The process of claim 6 wherein the maltodextrin has a DE of 5 to 15.

11. The process of claim 6 wherein the maltodextrin is in an amount of 12 to 18%, and the water is USP purified in an amount of 75 to 85%.

12. The process of claim 6 wherein the chloride ion concentration of said liquid concentrate is less than 25 ppm.

13. The process of claim 6 wherein the chloride ion concentrate of said liquid concentrate is less than about 10 ppm.

14. The process of claim 6 wherein the chloride ion concentration of said liquid concentrate is less than about 3 ppm.

15. The process of claim 6 wherein the pH of the concentrate is between 4 and 5.

* * * * *